United States Patent [19]

Takeda et al.

[11] Patent Number: 4,725,298

[45] Date of Patent: Feb. 16, 1988

[54] METHOD FOR MAKING LOW PRESSURE MERCURY VAPOR DISCHARGE LAMP

[75] Inventors: Takao Takeda, Chigasaki; Hitoshi Yamazaki, Yokohama; Yoshiteru Taniguchi, Kamakura; Norihiko Tanaka, Kawasaki; Hiroshi Ito, Tokyo; Minoru Uchida, Yokosuka; Jun Imai, Hiratsuka, all of Japan

[73] Assignee: Mitsubishi Denki Kabushiki Kaisha, Tokyo, Japan

[21] Appl. No.: 861,724

[22] Filed: May 12, 1986

Related U.S. Application Data

[62] Division of Ser. No. 723,967, Apr. 12, 1985.

[30] Foreign Application Priority Data

| | | | |
|---|---|---|---|
| Aug. 12, 1983 | [JP] | Japan | 58-147618 |
| Aug. 12, 1983 | [JP] | Japan | 58-147619 |
| Sep. 6, 1983 | [JP] | Japan | 58-163611 |
| Feb. 15, 1984 | [JP] | Japan | 59-26486 |
| Feb. 15, 1984 | [JP] | Japan | 59-26487 |
| Feb. 15, 1984 | [JP] | Japan | 59-26646 |

[51] Int. Cl.$^4$ ........ C03B 33/06

[52] U.S. Cl. ........ 65/23; 65/34; 65/36; 65/55; 65/42; 65/58; 65/45; 445/22; 445/26

[58] Field of Search ........ 65/23, 34, 36, 46, 47, 65/48, 49, 54, 55, 56, 58, 42; 445/22, 26

[56] References Cited

U.S. PATENT DOCUMENTS

| | | | |
|---|---|---|---|
| 2,561,859 | 7/1951 | Greiner | 65/54 |
| 2,699,014 | 1/1955 | Van Steenis | 65/55 |
| 4,530,710 | 7/1985 | Dullea et al. | 65/56 |
| 4,545,774 | 10/1985 | Van Gils et al. | 445/22 |

*Primary Examiner*—Robert L. Lindsay
*Attorney, Agent, or Firm*—Oblon, Fisher, Spivak, McClelland & Maier

[57] ABSTRACT

A low pressure mercury vapor discharge lamp forms an electric discharge path by the use of a bulb placed on an end plate and the bulb is formed by a process which results in the connecting outer side surfaces of juxtaposed glass tubes through communication holes formed in the outer side surfaces respectively. The process involves placing the juxtaposed glass tubes so that their outer surfaces are opposed in a contacting state. A portion of each of the glass tubes is heated in order to form a communication hole through the utilization of a burner inserted through an open end into the interior of each of the glass tubes in order to cause fusion of that particular portion in each tube to thereby form the communication hole by wind pressure. A mass of molten glass is then forced outward at the outer peripheral edge of the communication hole whereby these outer peripheral edges of the glass tubes are mutually connected by the mass of molten glass and the open end of the tubes are then closed to form a U-shaped passage between the tubes.

4 Claims, 46 Drawing Figures

METHOD FOR MAKING LOW PRESSURE MERCURY VAPOR DISCHARGE LAMP

This is a division of application Ser. No. 723,967, filed Apr. 12, 1985.

FIELD OF ART

The present invention relates to a low pressure mercury vapor discharge lamp provided with a bulb for forming an electric discharging path and preparation thereof.

BACKGROUND OF ART

There has been known a fluorescent lamp such as a low pressure mercury vapor discharge lamp provided with a U-shaped bulb formed with bending or connecting processes, from a publication such as Japanese Unexamined Patent Publication No. 155675/1979 (FIG. 1) or Japanese Unexamined Patent Publication No. 133744/1980 (FIG. 2). The fluorescent lamp having such construction is advantageous because a lamp is made in a compact form. However, the U-shaped bulb 1 as shown in the figure has a space of gap 31 between both legs 1*a*, 1*b*. Therefore, in manufacturing steps, when the legs 1*a*, 1*b* of the bulb 1 are gripped from their outer sides so that a force is applied in its central direction, a connecting part 2*a* between the both legs 1*a*, 1*b* is apt to cause breakage. Accordingly, a device A is generally used to grip the both legs 1*a*, 1*b* of the bulb 1 in a plan passing through the legs 1*a*, 1*b*, as shown in FIG. 3 which is disclosed in Japanese Unexamined Patent Publication No. 124928/1980. On the other hand, the fluorescent lamp in a compact form which is substituted for an incandescent lamp generally has the legs 1*a*, 1*b* of the bulb 1 of about 100–150 mm in height, on account of which the bulb has to be supported in only one direction in the manufacturing steps. This means that it is necessary to prepare the device A used for various manufacturing steps at a high accuracy thereby to cause problems of complicated maintenance and inspection.

Further, there has been proposed a fluorescent lamp in which a U-shaped bulb 1 is further bent into two parts (hereinbelow referred to as a double U-shaped bulb) aiming at further compactness of the lamp. FIG. 4 shows a lamp, as an example, disclosed in Japanese Unexamined Patent Publication No. 108162/1980. In this case, two U-shaped bulbs 1, 1 are arranged so that there remain spaces of gap 31, 32, 33 and 34 between all adjoining legs among the legs 1*a*, 1*b*, 1*c* and 1*d*. Therefore, when the two U-shaped bulbs have to be supported by a supporting device A without causing breakage of the connecting parts 2*a*, 2*b*, the structure of the device A must be complicated in comparison with the device for a single U-shaped bulb 1, this prohibiting a large scale production. The same condition applys to a fluorescent lamp of a double tube structure in which a U-shaped bulb is placed inside an outer bulb.

DISCLOSURE OF THE INVENTION

The present invention has been attained in view of the above-mentioned circumstances and it is an object of the present invention to provide a low pressure mercury vapor discharge lamp enabling a bulb to be easily gripped by a supporting device in manufacturing steps, simplifying a manufacturing device, rendering maintenance and inspection to be easy and allowing a large scale poduction, by arranging legs of a U-shaped bulb in a contacting state.

It is another object of the present invention to provide a low pressure mercury vapor discharge lamp reducing quantity of material to be used for sealing a bulb to an end plate through glass frit at an open end of the bulb in which the glass frit is arranged corresponding to the inner wall of the open end of the bulb, whereby sealing between the end plate and the open end of the bulb is established at inner wall of the bulb at the open end.

It is still another object of the present invention to provide a low pressure mercury vapor discharge lamp which reduces coating time of glass frit in a fitting groove and makes molding of an end plate easy by constructing the lamp so as to attach both ends of a U-shaped bulb to the end plate so that the both ends of the bulb is received in a common fitting groove for the glass frit, formed in the end plate.

It is further object of the present invention to provide a low pressure mercury vapor discharge lamp which is withstands an external force without pushing up manufacturing cost and impairing productivity and improves reliability on a bonding part by connecting a plurality of U-shaped glass bulbs in series, bonding both ends of the U-shaped glass bulbs directly to a common end plate with an adhesive and projecting electrodes so as to extend from the end plate inside the both ends of the glass bulb connected in series.

It is another object of the present invention to provide a process for preparing a low pressure merecury vapor discharge lamp which improves, in particular, coating operations of glass frit, assembling of parts and melting and solidifying operations of the glass frit when the bottom of a bulb, a stem and a discharge tube are bonded to an end plate through glass frit and which makes application of automatical operation easy and improved lamp characteristic.

It is still another object of the present invention to provide a process for preparing a low pressure mercury vapor discharge lamp permitting easy preparation of a bent glass tube used for a bulb.

BEST MODE OF THE PRESENT INVENTION

Figure 5:
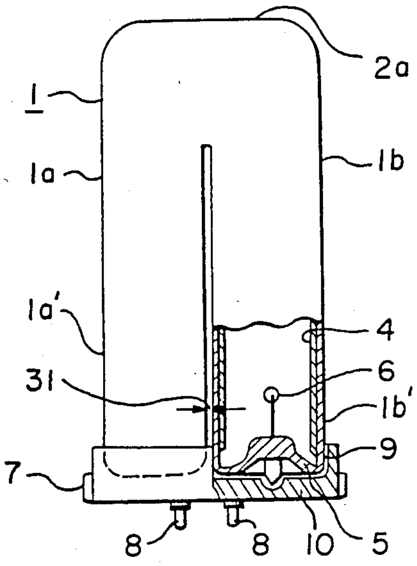
FIG. 5 is a front view partly cross-sectioned of an embodiment of the U-shaped bulb according to the present invention.

FIG. 5 is a front view partly omitted on an embodiment of the U-shaped fluorescent lamp according to the present invention. In FIG. 5, a reference numeral 1 designates a U-shaped bulb formed by juxtaposing two linear tubes of soda-line glass of 16.5 mm in outer diameter and 0.8 mm thick and connecting each one end so that the interior of the tubes is communicated with each other while keeping air-tightness to the outside. The heightness of thus obtained bulb 1 is 140 mm. Both the legs 1*a*, 1*b* of the bulb 1 are substantially in close contact with each other to constitute a contacting state. The contacting state referred in the specification means that a space of gap 31 between the end part 1*a*′ of the leg 1*a* and the end part 1*b*′ of the leg 1*b* of the bulb 1 is in the range of 0–0.8 mm. In other words, in the U-shaped bulb, when a force is applied to both the end parts 1*a*′, 1*b*′ toward the gap 31 from the outside, namely, when a force is applied to the both legs 1*a*, 1*b* from the side of plane perpendicular to a plane passing between the legs 1*a*, 1*b*, a tensile stress is applied to the connecting part 2*a* of the bulb 1 to cause elastic deformation in the connecting part 2*a*. However, since the both end parts 1*a*′, 1*b*′ of the legs are brought into a contacting state in the range not to exceed limitation of the elastic deformation breakage of the connecting part 2*a* is prevented.

A reference numeral 4 designates fluorescent layer, a numeral 5 designates 5 a stem, a numeral 6 designates electrodes, a numeral 7 designates a base metal, a numeral 8 designates a base metal pin, a numeral 9 designates an adhesive and a numeral 10 designates an end plate, all of which are the same as those used in the conventional lamp as shown in FIGS. 1 to 4.

In the fluorescent lamp constructed as above-mentioned, the both legs 1*a*, 1*b* of the bulb 1 are brought into a contacting state before the connecting part 2*a* exceeds limitation of the elastic deformation even though the elastic deformation is resulted in the connecting part 2*a* by a force applied to the both legs 1*a*, 1*b* toward the central part of them. Accordingly, the contacting part can resist against an external force applied after the legs have been contacted with each other to thereby avoid breakage of the connecting part 2*a*. The construction of the embodiment utilizes property of glass that it withstands compression stress although glass is apt to break against tensile stress. Therefore, there is no particular restriction to a manner of gripping the bulb 1 in manufacturing of the lamp whereby the structure of a manufacturing device is simplified and handling operations for bulbs in manufacturing steps can be flexible. However, when the gap 31 between the end parts 1*a*′, 1*b*′ of the legs 1*a*, 1*b* exceeds 0.8 mm in the above-mentioned embodiment, there greatly increase breakage of connecting part 2*a*. Naturally, dimension of the gap 31 is variable depending on the thickness of glass constituting the bulb 1 and the height of the bulb 1. When the outer configuration of the bulb 1 corresponds to a known incandescent lamp as is in the above-mentioned embodiment, it is effective to determine the gap 31 in the range of 0–0.8 mm, as stated above.

Figure 6:
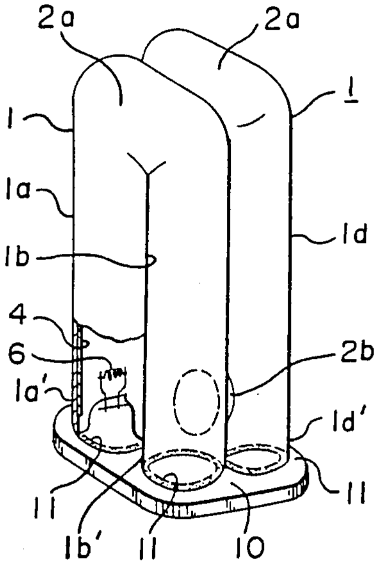
FIG. 6 is a perspective view showing another embodiment of the present invention.
Figure 7:
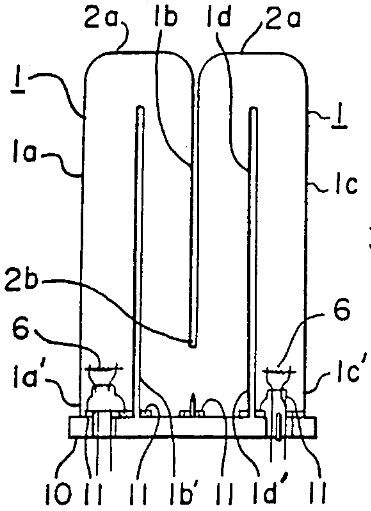
FIG. 7 is a schematic view of the bulb shown in FIG. 6 in a developed state.
Figure 8:
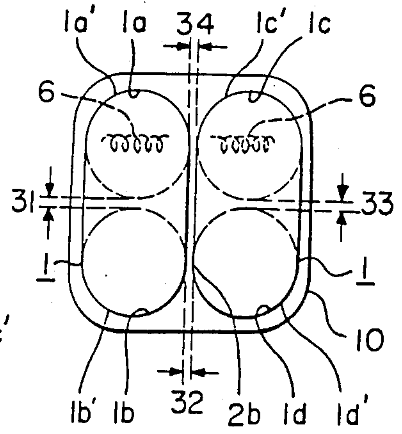
FIG. 8 is a plan view of the bulb shown in FIG. 6.

FIGS. 6 to 8 show another embodiment of the present invention in which FIG. 6 is a perspective view, FIG. 7 is a developed view and FIG. 8 is a plan view. In these Figures, numerals 1, 1 designate two U-shaped glass tubes, each being similar to that as shown in FIG. 5, in which they are integrally connected through a connecting part 2*b* which connects each one leg 1*b*, 1*d* of the both tubes so as to keep air-tightness to the atmosphere. The outer dimension of the U-shaped glass tubes is the same as that of FIG. 5 provided that the height of the tubes is 92 mm. In the bulb 1 formed by integrally connecting two U-shaped tubes, the end parts 1*a*′, 1*b*′, 1*c*′ and 1*d*′ of the legs are sealingly bonded to a disc-like ceramic end plate 10 with an adhesive of glass frit. Further, the legs 1*a*, 1*b* of the bulb 1 and the legs 1*c*, 1*d* of the other bulb 1 are firmly connected to the end plate 10 in such a manner that the legs 1*a*, 1*c* and the legs 1*b*, 1*d* which are respectively ones of adjacent bulbs 1, 1, are opposed in a contacting state. Namely, gaps 31, 32, 33, 34 of mutually adjoining legs 1*a*, 1*b*, 1*c*, 1*d* are respectively in the range of 0–0.8 mm.

Further, an electrode 6 projects into each one end part 1*a*′ or 1*c*′ of the bulbs 1, 1 and each end part 1*b*′ or 1*d*′ without receiving therein an electrode 6 is sealingly connected with each other at a position near the end plate 10. Accordingly, a discharge path formed between the two electrodes 6 takes a course of one of the electrode 6 arranged in the leg end part 1*a*′ of the bulb 1-the leg 1*a*-the leg 1*b*-the leg 1*d*-the leg 1*c*-the other electrode 6 arranged in the leg end part 1*c*′ of the bulb.

The fluorescent lamp having the construction as above-mentioned allows easiness of gripping of it in manufacturing steps, in addition that after completion of assemblage, breakage of the bulb 1 which may be caused when the lamp is attached to or detached from a lamp socket (not shown) is effectively prevented. Generally, in case of attaching or detaching operation of a lamp of this kind, the bulb 1 is gripped by an operator and a torque is applied to the bulb 1. Accordingly, in the attaching or detaching operation of the lamp, a torque and a force bringing the U-shaped glass tubes in contact with each other are centralized to the leg end parts 1*a*'-1*d*' of the bulb 1 whereby breakage of the leg end parts 1*a*'-1*d*' often takes place. However, in the embodiment of the lamp having four legs 1*a*-1*d* each being in contacting state, the legs 1*a*-1*d* can sufficiently withstand an external force which causes the legs to come in mutual contact. Further, because all the leg end parts 1*a*'-1*d*' are firmly connected to the end plate, the torque applied to the leg end parts 1*a*'-1*d*' is dispersed to reduce a risk of the breakage. In addition, this embodiment can be further in a compact form while elongate a discharge path and lamp efficiency can be further improved.

In the embodiment shown in FIGS. 6-8, however, all of the leg end parts 1*a*'-1*d*' of the serially connected bulb 1 are in contact with a single common end plate 10 and are sealingly bonded with the adhesive 11 of glass frit. Accordingly, each of the leg end parts 1*a*'-1*d*' co-operates to resist against an external force to fall down the bulb 1 if such external force is applied to the bulb 1. Accordingly, a trouble that there takes place cracks in the adhesive 11 of glass frit in the bonding part to break air-tightness in the bulb 1, owing to a force to fall down the bulb, can be eliminated. On the other hand, since the bulb 1 is so constructed that the legs 1*a*-1*d* are arranged in a bundled condition as shown in FIG. 6, it is unnecessary to provide an auxiliary means to support the bulb 1 in order to prevent the bulb 1 from falling down even at the time of solidifying operations of the adhesive 11 of glass frit, whereby the manufacturing steps for the lamp can be remarkably simplified.

A structure for preventing falling down of the bulb 1 is disclosed, for example, in Japanese Patent Aplication No. 213158/1982 which shows a lamp having a double tube structure. In such lamp, when legs of the bulb are gathered and when the glass bulb and an outer bulb are connected to a common end plate with use of glass frit, the glass bulb, the outer bulb and a glass stem can be simultaneously attached and solidified since the glass bulb can stand itself. Industrial merit obtained by such structure is great. The glass bulb shown in Japanese Patent Application No. 213158/1982 is formed in a double U-shape and the leg end portion at the side without receiving therein an electrode constitutes a curved portion which corresponds to the connecting part of this embodiment. In connecting the U-shaped glass bulbs, there is no limitation to use two U-shaped glass bulbs as in this embodiment but it may use more than two number of U-shaped glass bulbs with both legs which contain no electrode. In this case, when more than two number of U-shaped glass bulbs are arranged on the end plate so as to represent a polygon, it can impart an excellent design.

Material for the end plate 10 may be any as far as it has the coefficient of expansion the same as or approximate to the glass bulb 1 beside ceramics.

Figure 9:
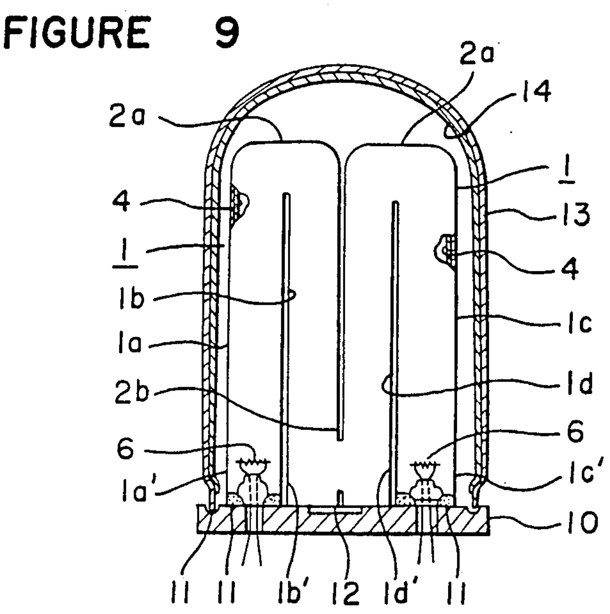
FIG. 9 is a developed view of another embodiment of the lamp according to the present invention.

FIG. 9 is a developed view showing another embodiment of the present invention in which numerals 1, 1 designate double U-shaped bulbs formed in the same manner as that shown in FIGS. 6 to 8. A reference numeral 10 designates a end plate made of ceramics such as forsterite which is attached with a pair of electrodes 6 in sealing condition. The electrodes 6 are received respectively in the end parts 1*a*', 1*c*' of the serially connected bulbs 1, 1. The electrodes 6 are communicated each other so as not to cause electric discharge by bonding the end parts 1*a*', 1*c*' of the bulbs to the end plate 10 with an adhesive 11 of glass frit. End parts 1*b*', 1*d*' without receiving therein any electrode 6 are in contact with the end plate 10. On the other hand, the end plate 10 is provided at its part where the end parts 1*b*', 1*d*' are contacted a recess as an opening portion 12 through which the bulbs 1, 1 are communicated with the inner portion of an outer bulb 13. The outer bulb 13 is a cylindrical tube made of glass having the inner surface coated with a light diffusion layer 14 and having an opened bottom. The opened bottom of the outer bulb 13 is sealingly closed by the end plate 10 and an discharging medium is filled in the outer bulb to form a discharging space.

The fluorescent lamp having the double tube structure as above-mentioned forms, in one hand, a double U-shaped electric discharge path as similar to the embodiment shown in FIGS. 6 to 8 and, on the other hand, causes the outer bulb 13 to form the mostly cooled part, whereby a mercury vapor pressure in the electric discharge space can be properly maintained to increase lamp efficiency. In this embodiment, since bulbs 1, 1 are arranged in mutually contacting state, the outer configuration of the lamp can be in a compact form in comparison with the conventional lamp having a double tube structure. Further, since the lamp is so made that any external force is not applied to the bulbs after completion of assembleage, it is sufficient to bond only the leg end parts 1*a*', 1*c*' receiving therein electrodes 6 to the end plate 10 with the adhesive 11 of glass frit. Accordingly, simplification of the manufacturing steps can be performed without reducing strength of the lamp required at the time of attaching or detaching operation. In addition, the lamp is of a structure that when the bulbs 1, 1 are bonded to the end plate 10, the leg end parts 1*a*'-1*d*' formed integrally with each other by means of connecting parts 2*a*, 2*b*, 2*a* are to be brought into contact with the end plate 10. Accordingly, bonding operation can be satisfactorily conducted without requirement of any auxiliary means to support the bulbs 1, 1.

Figure 10:
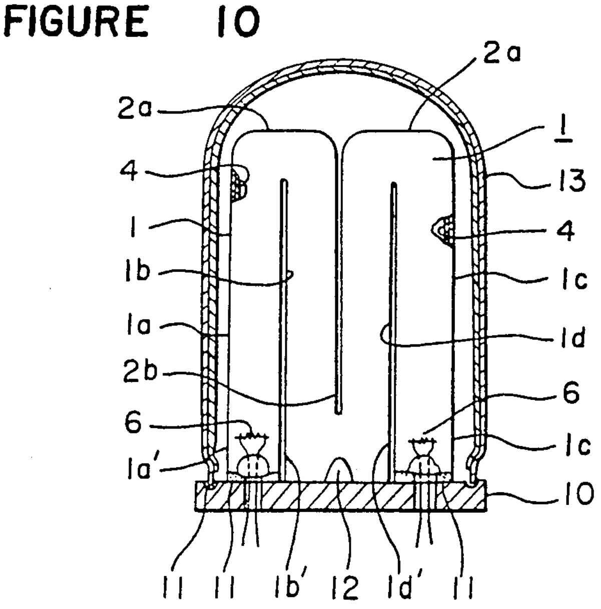
FIG. 10 is a developed view of still another embodiment of the present invention.

Also the recess is formed in the end plate 10 to use it as the opening portion 12 in the embodiment shown in FIG. 9, the opening portion 12 can be an aperture formed at a part of the bulb 1 or formed by cutting an edge portion of a bulb 1 as shown in FIG. 10. It is always unnecessary to use two U-shaped bulbs 1 and use of single bulb 1 provides the same effect as the embodiment shown in FIGS. 9 and 10.

For all the embodiments described before, description has been made as to the end plate 10 of ceramics; however, it is possible to use glass or metal other than ceramics.

Figure 11:
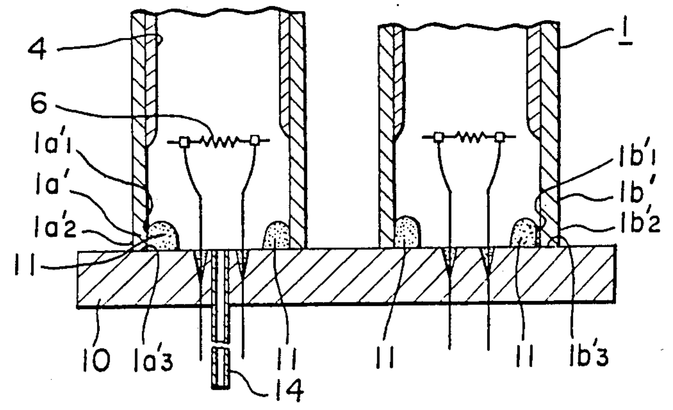
FIGS. 11 and 12 are enlarged cross-sectional view of an important part of another embodiment of the present invention.
Figure 12:
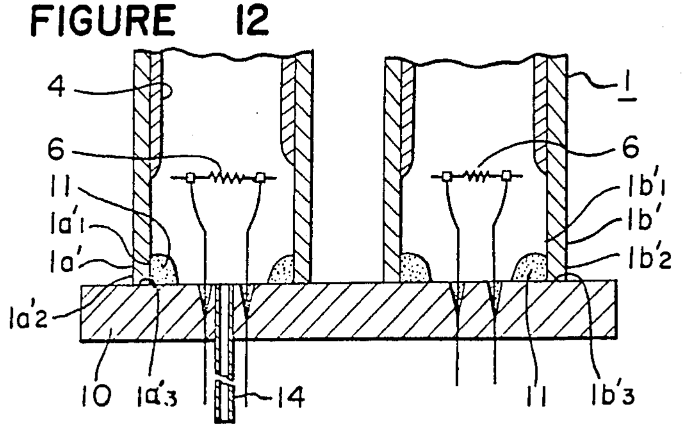

In the next place, still another embodiment of the present invention will be described with reference to FIGS. 11 and 12. This embodiment concerns how to connect an end plate 10 to a bulb 1. In the Figures, a reference numeral 1 designates a U-shaped bulb with both leg end parts 1*a*', 1*b*' opened. A pair of electrodes project from upper surface of the end plate 10, two pieces of adhesive 11 of glass frit in a form of ring the diameter of which is more or less smaller than the inner diameter of the opened leg end parts 1*a*', 1*b*' of the bulb are placed in such a manner that when the opened leg end parts 1$a'$, 1$b'$ of the bulb are mounted on the end plate 10 so as to surround each of the electrodes 6, the adhesive 11 respectively correspond to the inner walls $1a'_1$, $1b'_1$ of the opened leg end parts 1$a'$, 1$b'$. A reference numeral 14 designates a discharge tube. Then, the opened leg end parts 1$a'$, 1$b'$ of the bulb are placed on the end plate 10 containing therein each of the electrodes and glass frits 11. Two pieces of the adhesive 11 of glass frit are heated to be molten to thereby accomplish sealing the bulb 1 to the end plate 10. FIG. 12 shows condition of the bulb and the end plate sealed by heating.

With the construction as above-mentioned, the inner walls $1a'_1$, $1b'_1$ of the opened leg end parts 1$a'$, 1$b'$ of the bulb block prevent the molten adhesive from leaking out the outer circumferential edges of the opened leg end parts 1$a'$, 1$b'$. Further, the adhesive 11 of glass frit is applied to have a form of ring the diameter of which is more or less smaller than the inner diameter of the opened leg end parts 1$a'$, 1$b'$ of the bulb and accordingly, an amount of the adhesive to be applied can be reduced even if the adhesive is coated thicker, in comparison with a case that the end surfaces $1a'_3$, $1b'_3$ of the opened leg end parts 1$a'$, 1$b'$ of the bulb are placed on the end plate 10 on which the adhesive 11 of glass frit is previously applied. A bulb 1 of 15 mm in inner diameter at open end and of 0.85 mm thick was prepared to compare an amount of the adhesive to be applied for this embodiment with the case in which the adhesive was previously applied. It revealed that the amount of the adhesive for this embodiment is about 2.5 g for one lamp whereas 4.5 g for the other case. Further, air-tightness between the atmosphere and the bulb 1 of the open leg end parts 1$a'$, 1$b'$. In this case, since the inner walls $1a'_1$, $1b'_1$ are not contaminated with dust in comparison with the outer walls $1a'_2$, $1b'_2$, there takes place no problem of air-tightness. In addition, since the length of the circle of the inner walls $1a'_1$, $1b'_1$ is shorter than that the outer walls $1a'_2$, $1b'_2$, area for air-tightness is small. It is, therefore, advantageous in maintaining air-tightness. Further, the opened leg end parts 1$a'$, 1$b'$ are mounted on the end plate having a flat surface whereby there is no risk of causing inclination of the bulb.

The adhesive 11 of glass frit may be previously formed into a molded ring body having a diameter smaller than the inner diameter of the opened leg end parts 1$a'$, 1$b'$.

Figure 13:
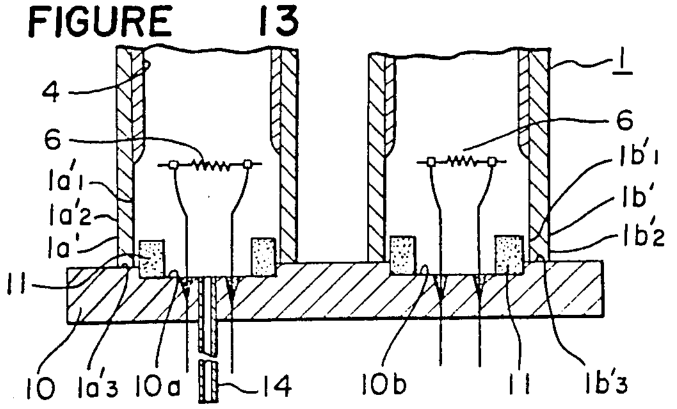
FIGS. 13 to 16 are respectively enlarged cross-sectional view of the other embodiments of the present invention.
Figure 14:
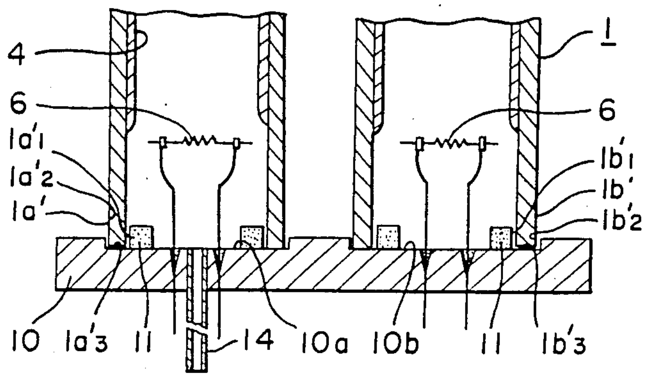

FIGS. 13 and 14 show other embodiments of the present invention. Glass frit fitting grooves 10*a*, 10*b* are respectively formed in an end plate 10; two pieces of adhesive 11 of glass frit previously molded into a ring form are respectively arranged in the fitting grooves 10*a*, 10*b* and the inner walls $1a'_1$, $1b'_1$ of opened leg end parts 1$a'$, 1$b'$ are sealed by the adhesive. According to the construction as above-mentioned, the ringed adhesive 11 of glass frit acts as a position determining member when the bulb 1 is sealed as shown in FIG. 13, in addition to many advantages as described in the foreign embodiments. On the other hand, in the embodiment shown in FIG. 14, determination of position can be easy since the bulb is received in the fitting grooves 10*a*, 10*b*.

Figure 15:
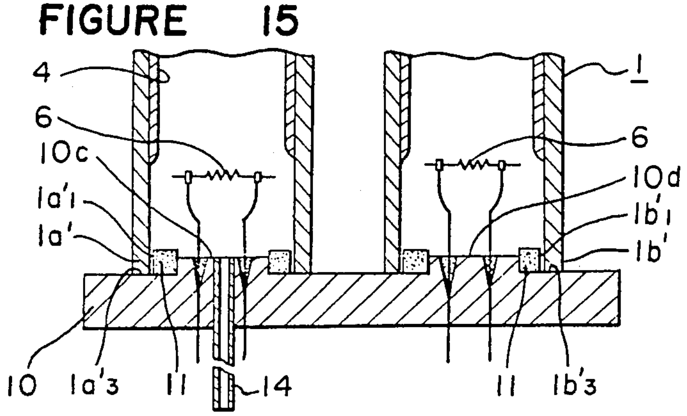

FIG. 15 shows still another embodiment. Projections 10*c*, 10*d* are formed in the end plate 10 to correspond to the inner diameter of the ringed adhesive 11 of glass frit and the ringed glass frit 11 is arranged around the projections 10*c*, 10*d*. The same effect as in the above-mentioned embodiment can be obtained in this embodiment.

Figure 16:
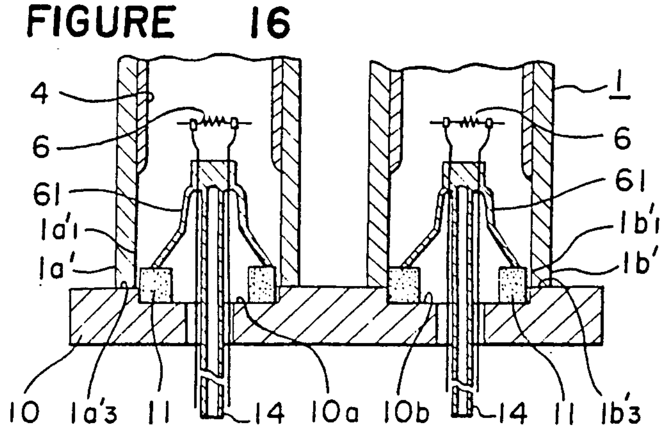

FIG. 16 shows a modified embodiment in which the electrode 6 is previously fitted to a flared glass stem 61. Use of this electrode allows simultaneously sealing of the stem 61 when the end plate 10 and the inner walls $1a'_1$, $1b'_1$ of the opened leg end parts 1$a'$, 1$b'$ are sealed together.

Figure 17:
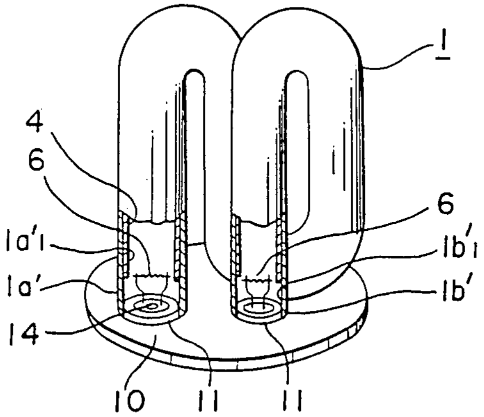
FIG. 17 is a perspective view partly cross-sectioned of another embodiment of the present invention.
Figure 18:
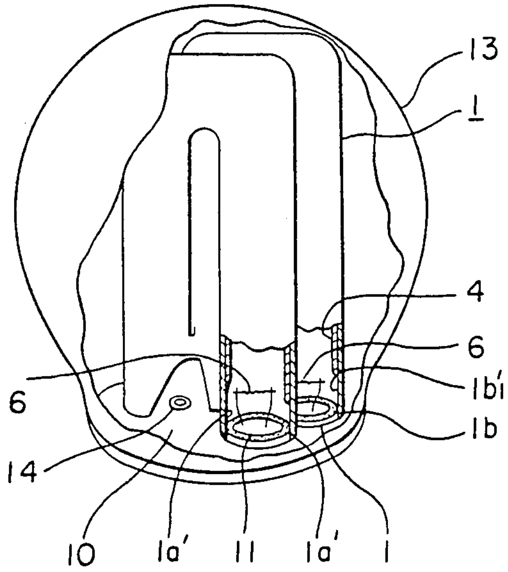
FIG. 18 is a perspective view of still another embodiment of the present invention in which a part of an outer bulb is broken and a part of bulb is cross-sectioned.

In the above-mentioned embodiments, description has been made as to lamps having U-shaped bulb. It is, however, not limited to a U-shape and it can be a shape as shown in FIG. 17. The bulb of the embodiments as above-mentioned can be applicable to a lamp having a double tube structure shown in FIG. 18 in which a bulb in a curbed form is arranged in a outer bulb 13 which provides a sealing space.

Figure 19:
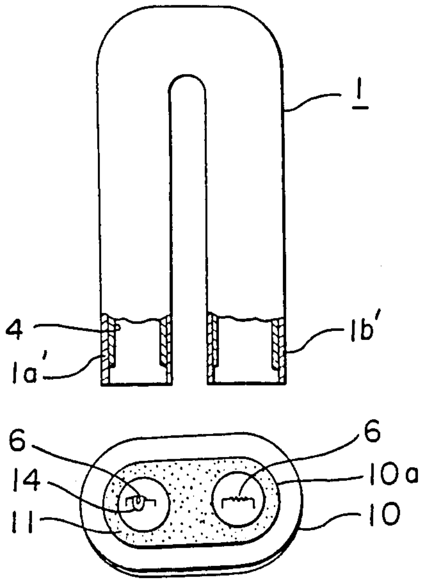
FIG. 19 is a perspective view in a disassembled state of another embodiment of the present invention.
Figure 20:
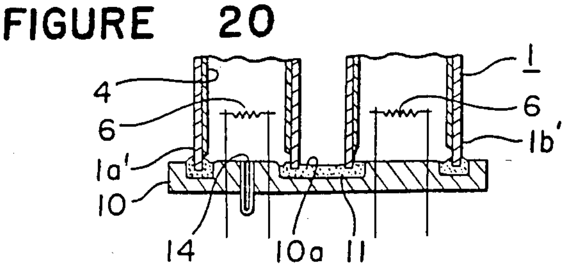
FIG. 20 is an enlarged cross-sectional view partly omitted of the bulb shown in FIG. 19.
Figure 21:
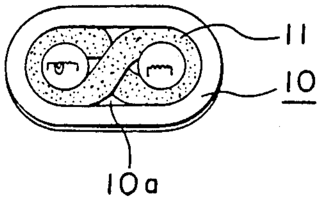
FIG. 21 is a plan view of a part of the lamp shown in FIG. 19.

Still another embodiment of the present invention will be described with reference to FIGS. 19 to 21. In FIGS. 19 to 21, a reference numeral 10 designates an end plate made of ceramics. In the upper surface of the end plate 10, a single glass frit fitting groove 10*a* having an oval recess which receives both leg end parts 1$a'$, 1$b'$ of a bulb described below. A pair of electrodes 6 is set up at a given position in the fitting groove 10*a*. The bulb 1 of a U-shape made of glass has both leg end parts 1$a'$, 1$b'$ and has the inner surface coated with a fluorescent layer 4. A reference numeral 11 designates an adhesive of glass frit and a numeral 14 designates a discharge tube.

As shown in FIG. 20, both the leg end parts 1$a'$, 1$b'$ of the bulb 1 are received in a common fitting groove 10*a* of the end plate 10 and are bonded thereto with the adhesive 11 of glass frit. The electrodes 6 are contained in the leg end parts 1$a'$, 1$b'$.

Soda-lime glass is used for the bulb 1; forsterite is used for the end plate 10 and a low melting point glass mainly consisting of boric acid-lead oxide is used for the glass frit 11 to bond the bulb and the end plate.

In the lamp of this embodiment, both the leg end parts 1$a'$, 1$b'$ of the bulb 1 are firmly connected into a single common fitting groove 10*a* formed in the end plate 10. Accordingly, application of the adhesive 11 of glass frit to the fitting position groove 10*a* is carried out by squeezing out glass frit paste in a letter of 8; thus, a single continuous squeezing operation of the glass frit paste is satisfactory to coat the paste in the fitting groove 10*a*. A single fitting groove structure of the embodiment greatly reduces time for applying the glass frit paste in comparison with a structure in which fitting grooves are separately formed. Namely, in the single fitting groove structure, it is unnecessary to squeeze the glass frit into one fitting groove after having stopped the squeezing operation to a separate fitting groove, in other wards, it is unnecessary to repeat operations of dispense and stop.

A single common fitting groove 10*a* makes a metallic mold for shaping the end plate 10 simple. Further, since the groove 10*a* has a broader common recess between both the leg end parts 1$a'$, 1$b'$ of the bulb 1, there takes place no unevenness in punched products when the end plate 10 is stamped whereby the ability of production is improved and the structure of the punching mold is simplified.

For tests, an end plate 10 having a length of 40 mm, a width of 22 mm and a thickness of 4.5 mm in which the length, the width and the depth of an oval fitting groove 10*a* are respectively 36 mm, 18 mm and 1.5 mm was prepared and another end plate having the same dimensions as those of the end plate 10 provided that there are two fitting grooves each having an outer diameter of 18 mm and a depth of 1.5 mm was prepared as a reference. Time for squeezing-out and applying of glass frit paste is compared and it was found that time in this embodiment is 1.5 second per one end plate and time in the reference product is 3.5 second per one end plate.

The end plate 10 prepared in accordance with this embodiment accomplished about 5% reduction in manufacturing cost of a metallic mold and about 7% increase in forming ability.

Figure 22:
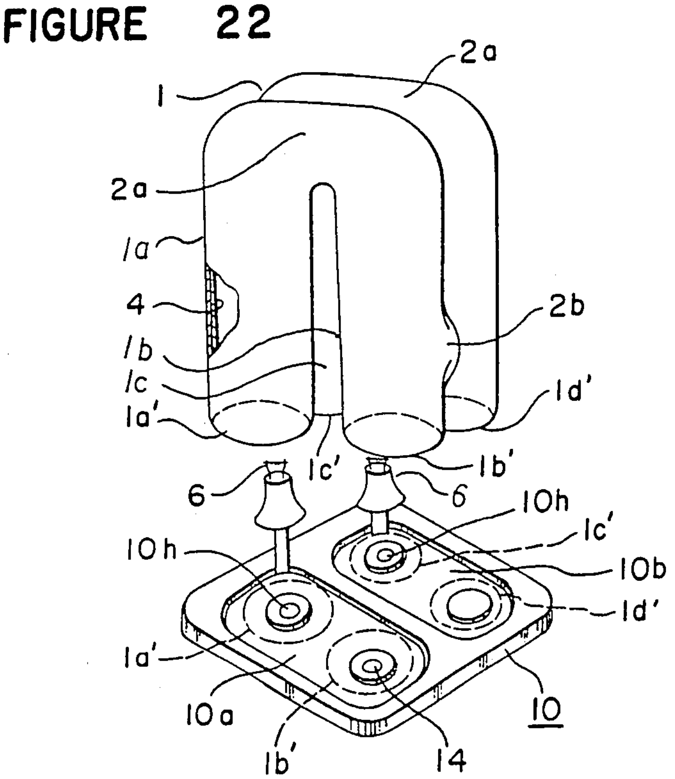
FIG. 22 is a perspective view in a disassembled state of another embodiment of the present invention.
Figure 23:
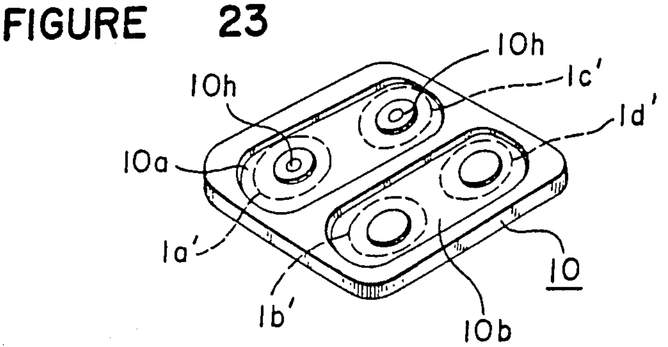
FIG. 23 is a perspective view of an end plate in FIG. 22.

In the embodiment, a single U-shaped bulb 1 is used. However, as shown in FIG. 22, a bulb 1 formed by integrally connecting a first U-shaped bulb and a second U-shaped bulb thereby having four legs 1*a*–1*d* can also be used as a lamp which provides an intensive light output without changing the total length of the bulb 1. In this case, the fitting groove for glass frit may be constructed in such a manner that there are formed a first fitting groove 10*a* for receiving both the leg end parts 1*a*′, 1*b*′ of the first U-shaped bulb and a second fitting groove 10*b* for receiving both the leg end parts 1*c*′, 1*d*′ of the second U-shaped bulb as shown in FIG. 22 or the first fitting groove 10*a* for receiving each one end 1*a*′, 1*c*′ of the first and second U-shaped bulbs as shown in FIG. 23, the dimension of the fitting grooves being determined depending on distance between the opened leg end parts 1*a*′, 1*b*′ of the first and second bulbs and the length of a connecting part 2*b* between the first and second U-shaped bulbs.

Figure 24:
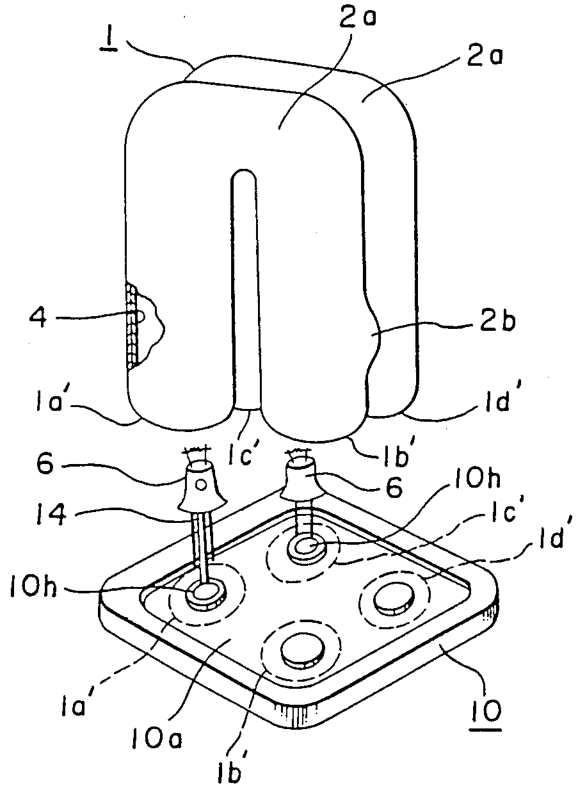
FIG. 24 is a perspective view in a disassembled state of further embodiment of the present invention.

It may be so constructed that all of the opened leg end parts 1*a*′, 1*b*′, 1*c*′ and 1*d*′ are received in a single common fitting groove 10*a* and are bonded thereto as shown in FIG. 24. A reference numeral 10h designates insertion holes for electrodes.

Figure 25:
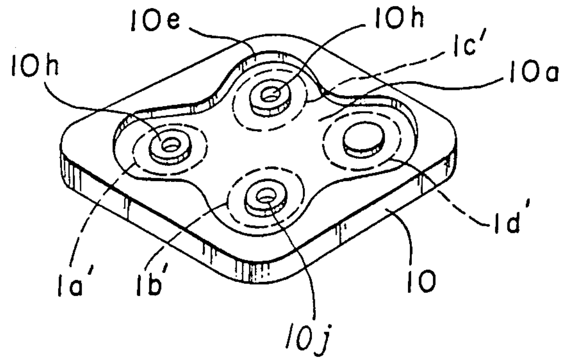
FIG. 25 is a perspective view of an end plate of another embodiment of the present invention.
Figure 26:
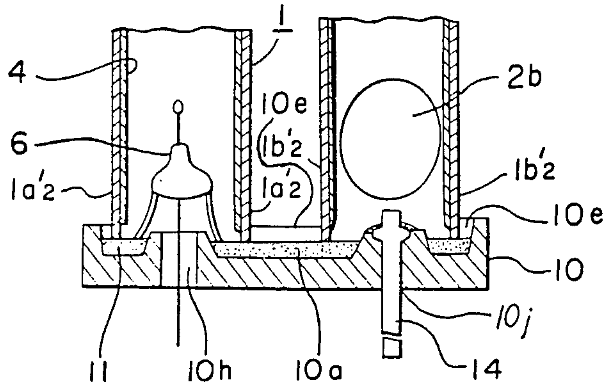
FIG. 26 is a cross-sectional view of the end plate.

As shown in FIGS. 25 and 26, the fitting groove 10*a* for receiving glass frit may be provided with bulb contacting portions 10*e* with which each part of the outer surface $1a'_2$, $1b'_2$ of the bulb are in contact. The bulb contacting portions 10*e* prevents the bulb from miss-fitting into the groove 10*a* or turning in the groove 10*a* when the bulb 1 is placed in the groove after having applied the adhesive 11 of glass frit to it.

Figure 27:
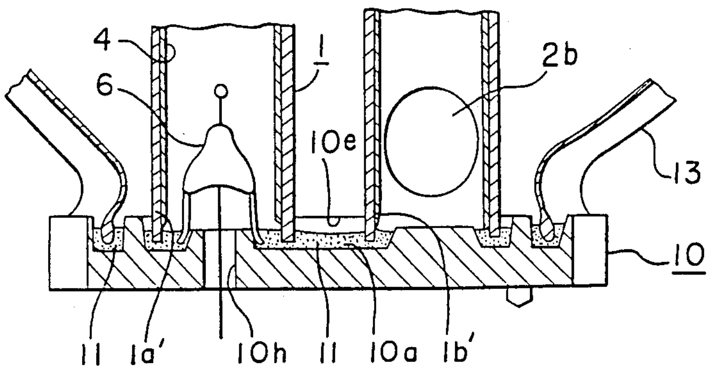
FIG. 27 is a cross-sectional view of another embodiment of the present invention.
Figure 28:
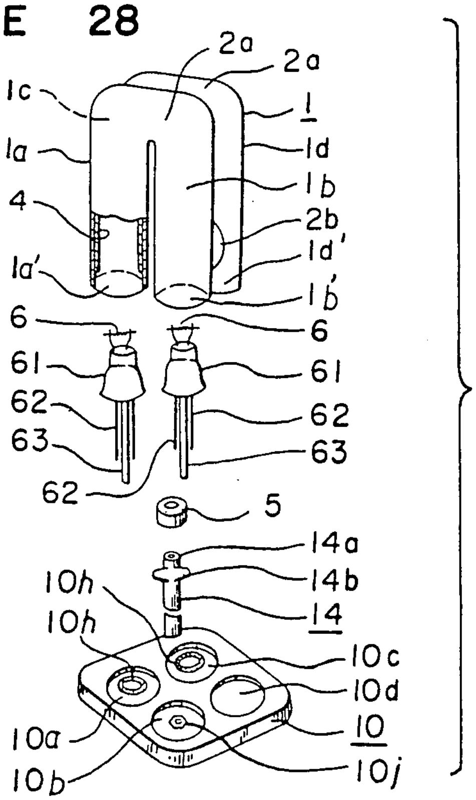
FIG. 28 is a perspective view in a disassembled state of another embodiment of the present invention.

In the above-mentioned, description has been made embodiment as to the lamp exposed in the atmosphere. However, the bulb 1 of the present invention is applicable to a lamp having a double tube structure as shown in FIG. 27, in which the bulb is arranged as an inner tube in an outer bulb 13 which sealingly confine the inner tube to the atmosphere. Material for the end plate 10 can be selected from glass or metal other than ceramics.

Another embodiment of the present invention will be descrived with reference to FIGS. 28 to 32. In these Figures, a reference numeral 1 designates a bulb consisting of two U-shaped glass tubes 1*a*, 1*d* made of soda-lime glass in which each one leg 1*b*′, 1*d*′ of the glass tubes is communicated with each other while keeping air tightness to the atmosphere and leg end parts 1*b*′, 1*d*′ of the bulbs are opened. A numeral 10 designates an end plate made of forsterite ceramics which is square in shape and sealingly closes the opened leg end parts 1*a*′–1*d*′ of the bulb 1. In the upper surface of the end plate 10, grooves 10*a*–10*d* respectively receiving therein the opened leg-end parts 1*a*′, 1*d*′ of the bulb 1, stem inserting holes 10*h* for receiving stems, described below, which are respectively formed in the grooves 10*a*, 10*c* and an exhaust tube insertion hole 10*j* which is formed in one of the grooves 10*a*, are provided. The grooves 10*a*, 10*c* are adapted to receive the stems.

Numerals 61 designate flared stems made of lead glass in which electrodes 6 are respectively sealingly attached and lead wires 62 and glass fine tubes 63 respectively extend outside from the stems. The diamter of a flared portion of the stems 61 is slightly smaller than the inner diameter of the glass tubes 1*a*, 1*c* of the bulb 1. A numeral 14 designates an exhaust tube made of lead glass. A flange-like enlarged diameter part 4*b* having a diameter greater than the exhaust tube insertion holes 10*j* is formed near the top end 14*a* of the exhaust tube 6 which is inserted in the bulb 1. A numeral 15 designates a pellet in a ring shape which is formed by molding glass frit as described below. A numeral 2*b* designates a connecting part for the bulbs 1*b*, 1*d*, and a numeral 4 designates a fluorescent layer coated on the inner surface of the bulb 1.

Description will be made in sequence as to process for bonding the lamp constructed as above-mentioned with use of glass frit.

1. A glass frit 11 in past form is previously prepared by mixing glass frit powder consisting of lead borate as a main component (such as IWF-T029 (tradename) manufactured by Iwaki Glass K.K. and a vehicle (obtained by dissolving nitrocellulose in isoamyl acetate).

Figure 29:
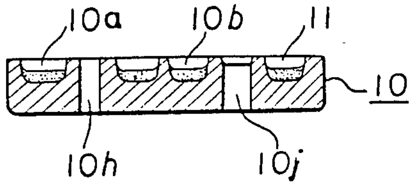
FIG. 29 is a cross-sectional view showing a coating step of the end plate shown in FIG. 27.

The glass frit as an adhesive 11, thus obtained, is coated in the grooves 10*a*, 10*b* formed in the upper surface of the end plat 10 as shown in FIG. 29.

Figure 30:
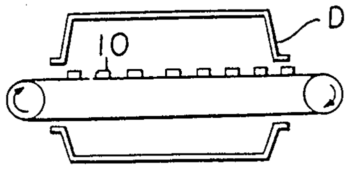
FIG. 30 is a diagram showing a drying process for the end plate shown in FIG. 27.

2. After coating operations, the end plate 10 is put in a tunnel type dry furnace D as shown in FIG. 30 and is dried at a temperature of about 150° C. for 15 minutes to dry the vehicle in the glass frit as the adhesive 11.

3. The exhaust tube 14 is inserted into the exhaust tube insertion hole 10*j* formed in the groove 10*b* of the end plate 10 and then, the pellet 5 is put onto the top end 14*a* of the discharge tube 14.

4. The stems 61 are respectively put on the grooves 10*a*, 10*c* of the end plate 10 while the lead wires 62 and glass fine tubes 63 are respectively inserted into the lead wire inserting holes 10*h*, 10*h*.

Figure 31:
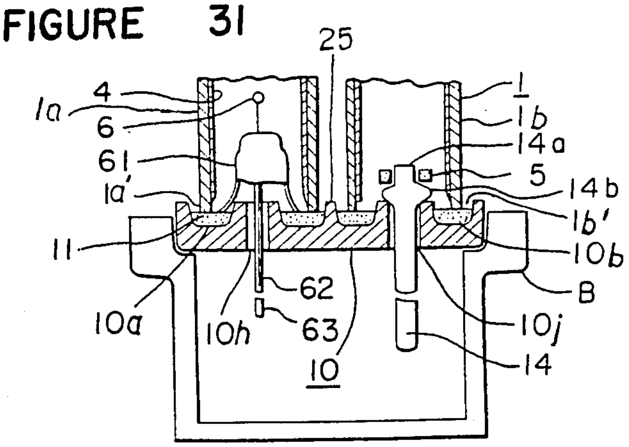
FIGS. 31 and 32 are respectively diagrams showing solidifying steps of glass frit shown in FIG. 27.

5. Each of the leg end parts 1*a*′–1*d*′ of the bulb 1 is put on each of the grooves 10*a*–10*d*. FIGS. 31 shows condition that operations as stated in items 3, 4, 5 have been completed. A symbol B designates an end plate supporting zig.

Figure 32:
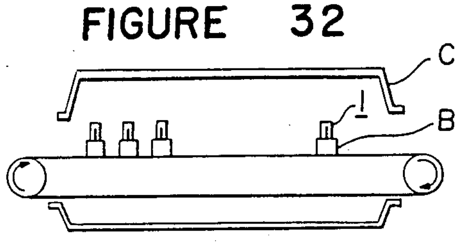

6. After completion of assembling operations, assembled products are put into a tunnel type furnace C as shown in FIG. 32 to be heated at 450° C. for 5 minutes whereby the adhesive 11 of glass frit and the pellets 5 as glass frit are molten heat and solidified; thus a series of bonding operations is completed.

In accordance with the bonding method as above-mentioned, application of the glass frit to requisite parts such as leg end parts 1*a*′–1*d*′ of the bulb 1 and the stems 61 can be performed by a single step, with the result of making coating operations easy. Further, since there is no obstacle other than the end plate 10 in the steps of coating and drying of the glass frit, the end plate can be handled simply as a square plate. Accordingly, the structure of a glass frit coating apparatus and a drying furnace A can be simplified and operations before and after various steps, that is, transferring and taking out the end plate 10 can be easily done.

On the other hand, when the exhaust tube 14, the pellet 5, the stems 61, and the bulb 1 are to be fitted to the end plate 1*b* in assembling operations, they are merely mounted or inserted in this order at given positions of the end plate as a series of operations which is easily carried out. The bonding of all parts can be performed by single heating step whereby the bonding step is simplified and there is no problem of reduction in strength in bonded portions.

Since the vehicle in the glass frit in a paste form is dried under condition that only the glass frit is coated on the end plate 10 before the bulb 1 is mounted on the end plate 10, diffusion of the vehicle is easy and it does not remain in the subsequent steps and accordingly, there is no problem that the vehicle is left in the bulb 1. The pellet 5 used to bond the exhaust tube 14 is a dried product formed by molding and no problem as above-mentioned takes place. In addition, there is no difficulty in manufacturing the pellet 5 itself because the pellet 5 is of small diameter.

In this embodiment, although the pellet 5 is put onto the top end 14*a* of the discharge tube 14 after the exhaust tube 14 has been inserted into the insertion hole 10*j*, there is no problem even if the pellet 5 is previously put onto the top end 14*a* and then, the exhaust tube 14 is inserted into the insertion hole 10*j*.

Figure 33:
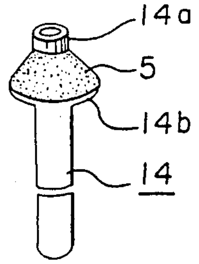
FIG. 33 is an enlarged perspective view showing another embodiment of the present invention.

It is not always necessary to use the pellet 5 for sealingly bonding between the exhaust tube 14 and the end plate 10, but it is possible that glass frit 5 in a paste form is coated on the upper surface of the enlarged diameter part 14*b* of the exhaust tube 14, the frit 5 is dried and then, the exhaust tube 14 is inserted into the insertion hole 10*j* as shown in FIG. 33. In accordance with this method, glass frit paste may be used for bonding the discharge tube as well as used for the bulb 1 and the stems 61 without impairing the effect of the above-mentioned embodiments.

Figure 34:
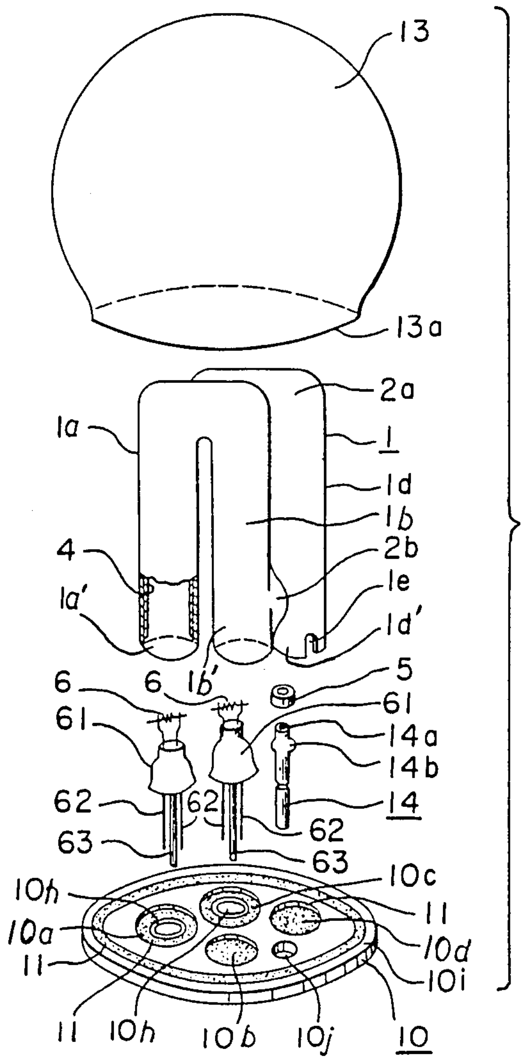
FIG. 34 is a perspective view in a disassembled state of another embodiment of the present invention.

In the above-mentioned embodiment, although description has been made as to bonding operation of a single bulb 1, the bonding operation of this embodiment can be applied to a lamp having a double tube structure comprising a first U-shaped bulb 1 and an outer bulb 13 as a second bulb which sealingly surround the first bulb 1, as shown in FIG. 34. Namely, in the lamp shown in FIG. 34, an annular groove 10*i* for receiving the bottom portion 13*a* of the outer bulb 13 and the second bulb is formed in the end plate 10 and the glass frit 11 is applied to the annular groove 10*i* at the same time of application of it to the grooves 10*a*–10*d* of the first bulb 1. In assembling operations, the outer bulb 13 as the second bulb may be mounted immediately after the first bulb 1 is mounted on the end plate. In the lamp in FIG. 34, an electric discharging space is formed by the second bulb, i.e. the outer bulb 13 and the end plate 10, on account of which it is not always necessary to form the insertion hole 10*j* for the exhaust tube 14 in the groove 10*a* or 10*d*, but the insertion hole 10*j* may be formed in a desired portion. A notched portion 1*e* is formed in the bulb 1 to communicate an enclosed gas between the bulb 1 and the outer bulb 13.

Another embodiment will be described. It is concerns a process for preparing a U-shaped bulb which is applicable to the above-mentioned embodiments.

In this embodiment, a U-shaped bulb is prepared by connecting glass tubes by the following steps.

Figure 35:
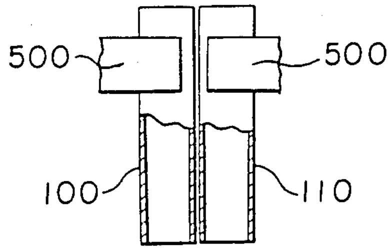
FIGS. 35 to 42 are diagrams showing an example of preparation of U-shaped glass tube.

1. As shown in FIG. 35, two linear glass tubes 100, 110 are respectively gripped by holders 500 in a contacting state.

Figure 36:
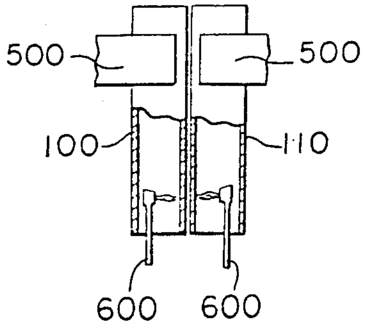

2. As shown in FIG. 36, gas burners 600 are respectively inserted into the glass tubes 1*a*, 1*b* from their open ends and are fixed at given positions so that flames of the burners 600 are opposed each other.

Figure 37:
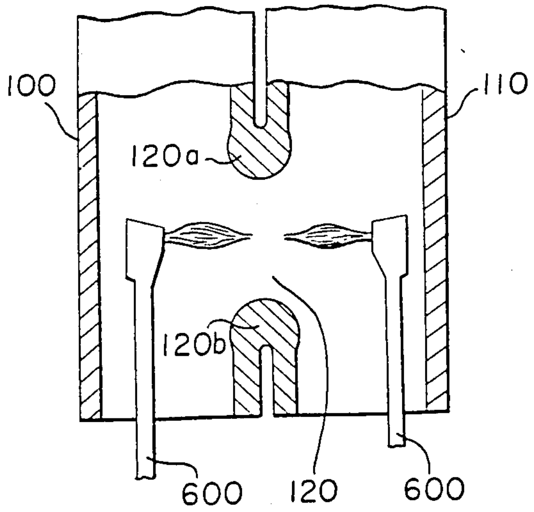

3. Each inner surface of opposed portions in the two glass tubes 100, 110 is heated to melt it at the local portions. In this case, an aperture as a communicating aperture 120 is formed at the molten portion by wind pressure of the burners 600; surface tension of glass acts on the molten portion to enlarge the communicating aperture 120 to thereby form masses of molten glass 120*a*, 120*b* at upper and lower circular edge portions of the communicating aperture 120. The masses of molten glass 120*a*, 120*b* are respectively forced outward by wind pressure of the burners 600 and finally, they are bridged at the extruded portions of the two glass tubes 100, 110 whereby they are communicated each other in an air-tight manner against the atmosphere (FIG. 37 shows connected condition).

Figure 38:
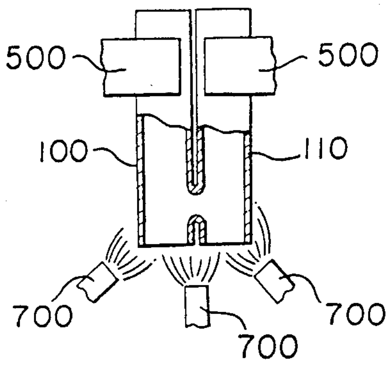
Figure 39:
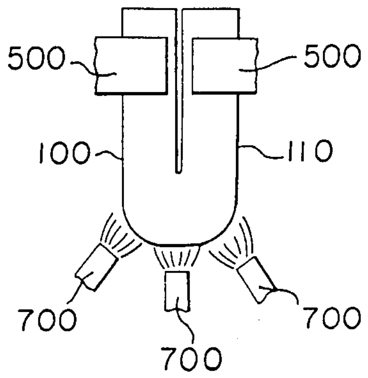

4. The burners 600 are withdrawn and both lower end parts of the glass tubes 100, 110 are heated by other burners 700 as shown in FIG. 38. Such heat treatment softens the ends of the glass tubes 100, 110 to cause shrinkage of them due to surface tension of glass whereby the ends are closed as shown in FIG. 39.

Figure 40:
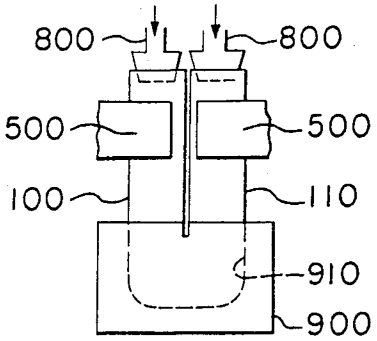
Figure 41:
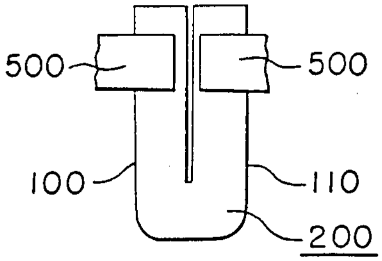
Figure 43:
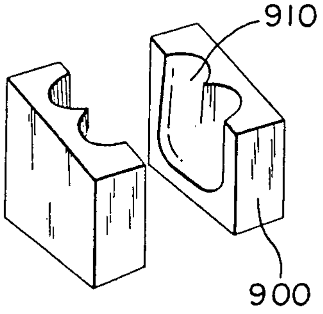
FIG. 43 is a perspective view in a disassembled state of a splitable mold.

5. Around the connecting part and the jointed end part, now softened, of the glass tubes 100, 110, a splittable shaping mold 900 is applied as shown in FIG. 40, the splittable mold being provided with in its cavity a curved groove 910 as shown in FIG. 43. As soon as applying the splittable mold around the above-mentioned portions, air feeding nozzles 800 are put in end parts at the opposite side of the softened end part of the glass tubes 100, 110 to feed air in the glass tubes 100, 110 to thereby pressurize inside the glass tubes. The air of feeding operations cause expansion of the softened glass portions to be closely fitted to the groove 910 inside the mold 900.

Figure 42:
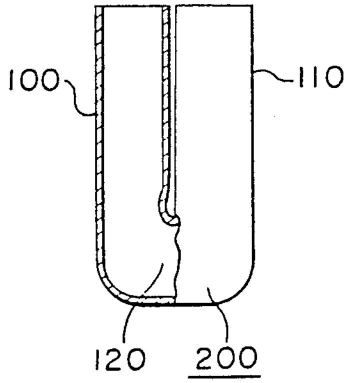

6. Air is stopped; the inside of the glass tubes 100, 110 is brought to the atmospheric pressure and the mold 900 is removed. Then, the glass tube 1 having a curved into a U-shape is completed as shown in FIGS. 40 and 42.

Figure 44:
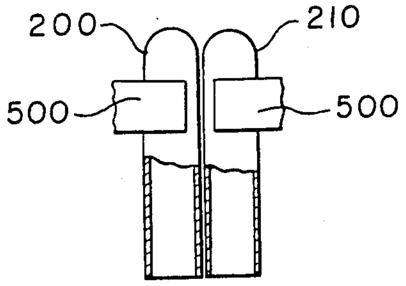
FIGS. 44 to 46 are diagrams showing another example of preparation of a double U-shaped glass tube by using single U-shaped glass tubes.

7. Two U-shaped glass tubes 200, 210 which have been prepared by the steps 1–6 are gripped by holders 500 with each leg of them closely faced as shown in FIG. 44.

Figure 45:
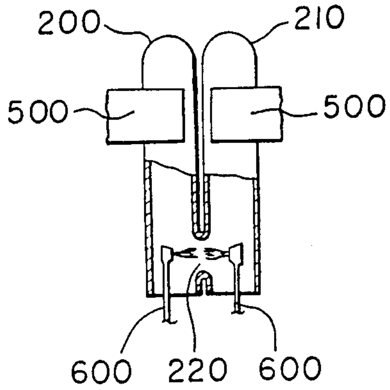
Figure 46:
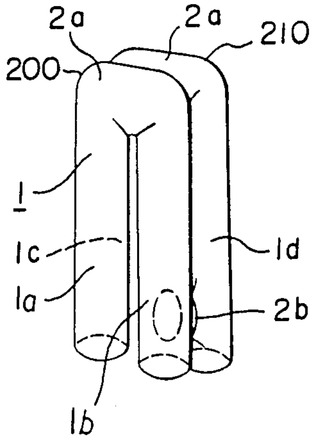

8. The burners 600 are inserted in the gripped glass tubes from each one end part and the U-shaped glass tubes are connected each other with use steps the same steps 2 and 3 previously mentioned, as shown in FIGS. 45 and 46; thus, a double U-shaped glass tube is completed.

The contacting state referred in this embodiment means condition that a part of or all of the glass tubes 100, 110, 200 and 210 arranged in jaxtaposition are in contact with each other or that if not in contact with each other, they are in a position to the extent that no breakage takes place at the connecting part of the communication hole 220 when an external force is applied to the glass tubes 200, 210 at a position without having the communication hole 220 to bring the end parts in contact with each other.

Since the double U-shaped glass tube formed by the process as above-mentioned does not employ bending operation at all, there causes no problem that the thickness in a bent portion is small; the strength of glass is reduced and unevenness of wall thickness of the glass causes fault of a molded product, in comparison with a molded product obtained by the bending operation. Further, a glass tube forming apparatus (not shown) for glass tubes used in the present invention needs no glass tube lifting means whereby the structure can be simplified, manufacture of the apparatus can be easy as well as its maintenance and inspection.

In accordance with the manufacturing process as above-mentioned, two glass tubes 100, 110 are arranged in a contacting state and are connected with each other to be a substantially U-shape and then, two U-shaped glass tubes 200, 210 thus formed are arranged in a contacting state and are connected with each other. Accordingly, it is equivalent to a glass tube which is formed by bending it at the maximum curvature whereby the entire configuration of the glass tube is made compact.

Figure 1:
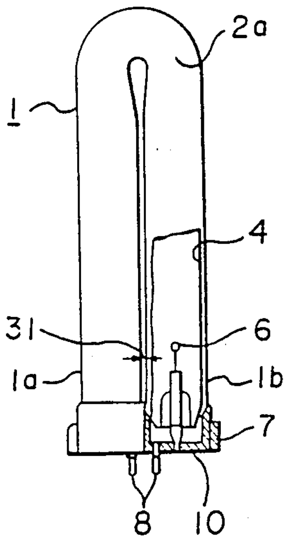
FIGS. 1 and 2 are respectively front views of conventional U-shaped fluorescent lamps.
Figure 2:
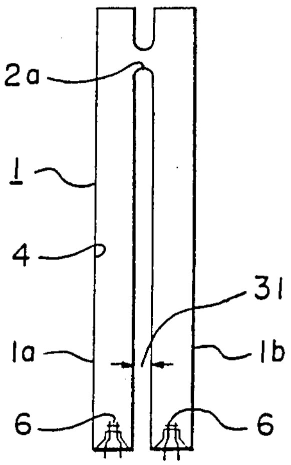
Figure 3:
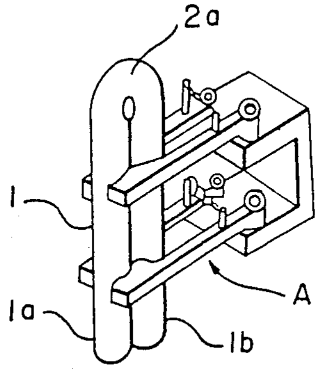
FIG. 3 is a perspective view showing how U-shaped bulb is gripped by a device in manufacturing steps.
Figure 4:
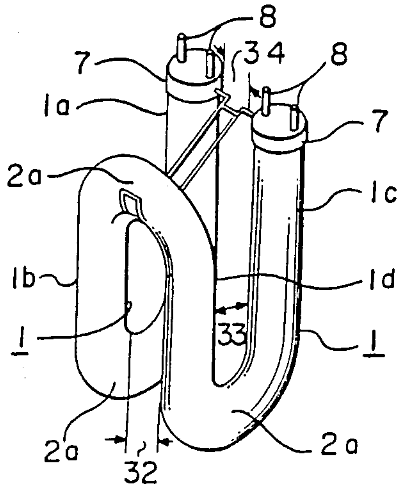
FIG. 4 is a perspective view of a conventional double U-shaped fluorescent lamp.

The description concerning the manufacturing steps 1-8 was for a preferred embodiment for forming linear glass tubes into a double U-shaped tube. Among the steps 1-8, the steps 1-6 provide a U-shaped glass tube 200. the U-shaped glass tube 200 has the same effect as the double U-shaped glass bulb 1 as previously mentioned. The U-shaped glass tube 200 enables the manufacturing steps to be very easy since the glass tubes 100, 110 are directly connected each other unlike the conventinal U-shaped glass bulb as shown in FIG. 2 in which a connecting collar is used to connect the glass tubes 100 and 110.

On the other hand, in accordance with the manufacturing steps 1-3, the glass tubes 100, 110 are arranged in a contacting state; the inner surfaces of the glass tubes 100, 110 are heated by the opposed burners 600; the inner walls are molten and apertures are formed by wind pressure of the burners; and molten portions of the glass tubes 100, 110 are directly connected at the peripheral edges of the apertures to form a communicating hole 120 in air-tight condition. Thus, aperture forming operations for the communicating hole 120 and connecting operations of the two glass tubes 100, 110 for mutual communication can be conducted at the same time. It is unnecessary to use a connecting collar and connecting operations are remarkably simplified. Further, since the glass tubes 100, 110 are in a contacting state, portions other than the connecting part become in contact state before the contacting part is broken and absorb a stress applied to the contacting part; thus the breakage of the contacting part is prevented.

The glass tubes connected by the steps 1-3 may be utilized as a glass tube for an electric discharge lamp such as a fluorescent lamp by further forming it in such a manner that after the end parts of the glass tubes 100, 110 are melt bonded as shown in FIGS. 38-40, melting operations are carry out to form a glass tube in a U-shape or a glass tube consisting of alternately continuous connection of a U-shape and an inverted U-shape. When the steps 1-3 are carried out, it is the end parts of the glass tubes 100, 110 may be closed like a test tube before connecting operations or they may be previously bent in a U-shape. Further, it is also possible that except for at the end parts of the glass, tubes 100, 110 are closed, a cylindrical body with a closed end (not shown) made of separate material such as glass, ceramics or metal is sealingly bonded to the glass tube with an adhesive.

We claim:

1. A process for preparing a low pressure mercury vapor discharge lamp for forming an electric discharge path by a bulb placed on an end plate, wherein said bulb is formed by connecting outer side surfaces of juxtaposed glass tubes through communication holes formed in said outer side surfaces while keeping air-tightness with respect to the atmosphere, wherein said bulb forming comprises the steps of:

placing said juxtaposed glass tubes so that said outer side surfaces are opposed to each other in a contacting state;

heating a portion of each of said glass tubes in order to form a communciation hole wherein said heating is accomplished by a flame of a burner inserted through an open end into the interior of each of said glass tubes in order to cause fusion of said portions to thereby form said communication hole by wind pressure of said burners; and forcing outward a mass of molten glass at the outer peripheral edge of said communication hole whereby said outer peripheral edges of said juxtaposed glass tubes are mutually connected by said mass of molten glass closing said open end of said tubes to form a U-shaped passage between the tubes.

2. A process for preparing a low pressure mercury vapor discharge lamp according to claim 1, wherein each one end part of said juxtaposed glass tubes is closed.

3. A process for preparing a low pressure mercury vapor discharge lamp according to claim 1, wherein said juxtaposed glass tubes are formed in a U-shape.

4. A process for preparing a low pressure mercury vapor discharge lamp for forming an electric discharge path by a bulb placed on an end plate, wherein said bulb is formed by contacting outer side surfaces of juxtaposed glass tubes through communication holes formed in said outer side surfaces while keeping air-tightness with respect to the atmosphere, wherein said bulb forming comprises the steps of:

placing said outer side surfaces of said juxtaposed glass tubes so that both end parts are opened and so that said outer side surfaces are opposed to each other in a contacting state;

heating by a flame of a burner inserted into the interior of each one of said glass tubes to cause fusion of a portion of each tube wherein said portions are opened to form a communication hole between said tubes which is near the end part to thereby form a communciation hole by wind pressure of said burners;

forcing outward a mass of molten glass at the outer peripheral edge of said communciation hole whereby the outer peripheral edges of said juxtaposed glass tubes are mutually connected by said mass of molten glass; and heating the end parts at the side of said communciation holes of said glass tubes in order to cause melt-bonding due to shrinkage in the end parts; and placing said melt-bonding portion of said glass tubes in a mold having a predetermined shape and applying a pressure to the inside of said glass tubes to shape said melt-bonding portion.

* * * * *